United States Patent [19]

Goel et al.

[11] Patent Number: 4,539,376

[45] Date of Patent: Sep. 3, 1985

[54] CROSS-LINKING OF MALEIC ANHYDRIDE POLYMERS WITH BICYCLIC AMIDE ACETALS

[75] Inventors: Anil B. Goel, Worthington; Harvey J. Richards, Columbus, both of Ohio

[73] Assignee: Ashland Oil, Inc., Ky.

[21] Appl. No.: 659,200

[22] Filed: Oct. 9, 1984

[51] Int. Cl.$^3$ ................................................. C08F 8/30
[52] U.S. Cl. ..................................... 525/375; 525/327.6
[58] Field of Search ............................. 525/375, 327.6

[56] References Cited

U.S. PATENT DOCUMENTS

| | | | |
|---|---|---|---|
| 3,637,610 | 1/1972 | Jacobson | 525/327.6 |
| 3,763,083 | 10/1973 | Kalopississ et al. | 525/327.6 |
| 3,969,323 | 7/1976 | Forrer et al. | 430/176 |
| 4,046,748 | 9/1977 | Schluenz et al. | 525/327.6 |
| 4,059,545 | 11/1977 | Corbett et al. | 525/327.6 |
| 4,307,224 | 12/1981 | Rogier | 528/296 |
| 4,399,263 | 8/1983 | Brodoway | 525/327.6 |

Primary Examiner—Joseph L. Schofer
Assistant Examiner—Bernard Lipman
Attorney, Agent, or Firm—John F. Jones

[57] ABSTRACT

The process for cross-linking maleic anhydride containing polymers by reaction with bicyclic amide acetals is described.

8 Claims, No Drawings

CROSS-LINKING OF MALEIC ANHYDRIDE POLYMERS WITH BICYCLIC AMIDE ACETALS

CROSS-REFERENCE TO RELATED PATENT APPLICATIONS

The bicyclic amide acetals useful in this invention and their manufacture are more fully described in the co-pending U.S. patent applications of Anil B. Goel, Ser. No. 641,238; and Anil B. Goel and Harvey J. Richards, Ser. No. 641,242, both filed on Aug. 16, 1984.

This invention relates to the cross-linking of maleic anhydride polymers by means of bicyclic amide acetals and to the cross-linked products.

Bicyclic amide acetals have been shown to react with saturated carboxylic acid anhydrides at high temperatures (greater than 100° C.) to give linear, low molecular weight polymers (number average molecular weights of about 10,500) which are soluble in solvents such as chloroform [*Angew Chem.*, 79, 189 (1967); *Angew Chem. Intl. Edn.* 6, 178 (1967)]. No use of bicyclic amide acetals in cross-linked polymers or the use of bicyclic amide acetals in reactions with maleic anhydride polymers have previously been described.

The cross-linked maleic anhydride polymers which result from their reaction of bicyclic amide acetals possess much improved and desirable properties such as higher softening temperature, better solvent resistance, higher molecular weight and the like. The cross-linked maleic anhydride interpolymers of this invention are useful in adhesives, coatings and other applications.

We have discovered that bicyclic amide acetals will react with maleic anhydride homopolymers and maleic anhydride copolymers with other mono-vinyl monomers at temperatures in the range of from about ambient temperature up to about 200° C. to form cross-linked polymers having improved properties. It is believed that the bicyclic amide acetals, which are bifunctional, react with anhydride groups on different polymer chains to cause the cross-linking.

The bicyclic amide acetals useful in the present invention are those conforming to the following Formula I.

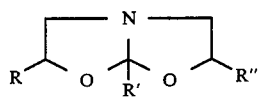

I

In Formula I, R represents hydrogen or an alkyl group having from 1 to 18 carbon atoms, R' represents an alkyl group having from 1 to 18 carbon atoms or an aryl or alkaryl group having from 6 to 18 carbon atoms, and R" represents hydrogen or an alkyl group having from 1 to 18 carbon atoms, an aryl group having from 6 to 12 carbon atoms or a hydrocarbon ether group having from 2 to 18 carbon atoms.

The copolymers and interpolymers of maleic anhydride and other monovinyl monomers which are useful in this invention are for the most part well known and their methods of preparation by free radical initiation are also well known to those skilled in the art. Typical monovinyl monomers which alone or in combination can copolymerize with maleic anhydride include the vinyl halides, vinyl ethers, vinyl hydrocarbons such as styrene isobutylene, vinyl pyridine, vinyl esters, acrylic and methacrylic acid esters, vinyl ketones, allyl esters of saturated carboxylic acids, and the like.

For the purposes of this invention, the maleic anhydride containing copolymer should contain from 0.1 to 50% on a molar basis of polymerized maleic anhydride in it. As the bicyclic amide acetal reacts with the maleic anhydride polymer, the product usually goes through a gel stage and ultimately to an insoluble, infusible stage. When the maleic anhydride containing polymer is of a high molecular weight (greater than about 100,000), less reaction with the bicyclic amide acetal is required to convert the polymer to the gelled or insoluble condition and in this case a maleic anhydride content of as little as 0.1 mole % is usually adequate for cross-linking. In cases in which the maleic anhydride containing polymer is of intermediate molecular weight (10,000 to 100,000), about 5 mole percent of maleic anhydride in the polymer is usually sufficient for good cross-linking with the bicyclic amide acetal.

The amount of bicyclic amide acetal useful in this invention can vary from 0.1 to 100 (mole % based on anhydride mole %).

The reaction between the bicyclic amide acetal and the maleic anhydride containing polymer takes place fairly rapidly and exothermically. No volatile material is formed in the cross-linking reaction so that no unwanted foaming occurs in the polymer mass as cross-linking proceeds. This feature is very valuable when the reaction of this invention is applied to RIM (Reaction injection molding) technology. The cross-linking reaction of this invention will take place even at room temperature, especially when the maleic anhydride containing polymer is dissolved in a solvent. Heating of the polymer-bicyclic amide acetal accelerates the rate of the cross-linking reaction.

The cross-linking reaction of this invention can be carried out either with or without a solvent and other adjuvants such as fillers, colorants, etc., can be included in the reaction mixture if desired.

The invention is further illustrated in the following representative examples.

EXAMPLE 1

A copolymer of styrene and maleic anhydride containing about 10% molar maleic anhydride and having a molecular weight in the range of 100,000 to 200,000 was used. A solution was prepared by dissolving 30 g. of this styrene/maleic anhydride copolymer in 170 g. of toluene. The solution was divided into four equal portions (A-C Below), to each portion was added the indicated amount of the bicyclic amide acetal indicated below and each of the resulting solutions was placed in a viscosity tube and allowed to stand at room temperature. The following observations were made:

| Tube | Bicyclic Amide Acetal (Formula I) | Amount Added | Observation |
|---|---|---|---|
| A | R,R',R"=H | 0.9 g | Gel Time 15-20 Min. |
| B | R,R"=H,R'=Me | 1.0 g | Gel Time 15-20 Min. |
| C | R=H,R'=Et,R"=CH$_2$OCH$_2$CH=CH$_2$ | 1.7 g | Gel Time 30 Minutes |

EXAMPLE 2

A 50:50 mole copolymer of maleic anhydride and styrene having a molecular weight in the range of greater than 200,000 was used. Two grams of this copolymer were dissolved in 20 ml of acetone and to this solution was added 0.13 g of the bicyclic amide acetal described in Example 1B above. The functionality ratio of anhydride: bicyclic amide acetal was about 10:1 (10% bicyclic amide acetal based on maleic anhydride). The resulting solution gelled within 20 minutes.

EXAMPLE 3

Four grams of the maleic anhydride/styrene copolymer described in Example 1 were dissolved in 20 ml of toluene. To this solution was added 0.5 g of the bicyclic amide acetal described in Example 1B above. The resulting solution was held at room temperature for about 5 minutes and was then applied to a glass plate in the form of a thin film (4 mil thickness). The coated plate was allowed to dry for one hour at room temperature in an anhydrous atmosphere. The resulting film was found to be dry, clear, colorless and insoluble in acetone and toluene.

EXAMPLE 4

A copolymer of maleic anhydride and $C_{16}H_{33}CH=CH_2$ n-octadecene which contained 50 mole % of maleic anhydride and had a molecular weight in the range of about 100,000 was used. Two grams of this maleic anhydride copolymer were dissolved in 8 g of acetone and to this solution was added 0.3 g of the bicyclic amide acetal described in Example 1B above. The resulting solution was applied to a glass plate in the form of a 4 mil thick film and the film was dried for an hour at room temperature in a dry atmosphere. The resulting clear, colorless film was found to be insoluble in acetone, chloroform and other solvents.

EXAMPLE 5

Two grams of the maleic anhydride copolymer used in Example 4 were powdered and mixed with 0.5 g of the bicyclic amide acetal of Formula I in which R and R″ are H and R′ is methyl. The reaction was exothermic. The resulting mixture was heated at 155° C. for 10 minutes. The resulting solid was found to be insoluble in chloroform, acetone, tetrahydrofuran and other solvents which were capable of dissolving the untreated maleic anhydride copolymer. The cross-linked solid did not melt when taken to a temperature of 250° C. Whereas the untreated maleic anhydride copolymer was found to melt at just under 155° C.

We claim:

1. The process for cross-linking a maleic anhydide homopolymer or interpolymer with at least one other mono vinyl monomer comprising reacting said homopolymer or interpolymer with a bicyclic amide acetal conforming to the formula

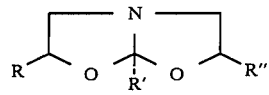

wherein R represents hydrogen or an alkyl group having from 1 to 18 carbon atoms, R′ represents an alkyl group having from 1 to 18 carbon atoms or an aryl or alkaryl group having from 6 to 18 carbon atoms, and R″ represents hydrogen or an alkyl group having from 1 to 18 carbon atoms, an aryl group having from 6 to 12 carbon atoms, or a hydrogen ether group having from 2 to 18 carbon atoms.

2. The process of claim 1 wherein the maleic anhydride interpolymer is a copolymer of maleic anhydride and at least one other monovinyl monomer selected from the group consisting of a vinyl halide, a vinyl ether, a vinyl hydrocarbon, vinyl pyridine, a vinyl ester, an acrylic acid ester, a methacrylic acid ester, a vinyl ketone and an allyl ester of a saturated carboxylic acid.

3. The process of claim 2 carried out at a temperature in the range of from about 0° C. to 100° C.

4. The process of claim 2 in which an interpolymer of maleic anhydride and styrene is employed.

5. The process of claim 2 wherein an interpolymer of maleic anhydride and $C_{16}H_{33}CH=CH_2$ is employed.

6. The process of claim 2 wherein R, R′ and R″ are —H.

7. The process of claim 2 wherein R and R″ are —H and R′ is —CH₃.

8. The process of claim 2 wherein R is —H, R′ is —CH₂CH₃ and R″ is —CH₂OCH₂CH=CH₂.

* * * * *